No. 646,782. Patented Apr. 3, 1900.
H. WYSS.
THRUST BEARING.
(Application filed Aug. 25, 1898.)

(No Model.)

Witnesses:
J. Granville Meyers
H. B. Keefer

Inventor
Henri Wyss
By James L. Norris
Atty

THE NORRIS PETERS CO., PHOTO-LITHO., WASHINGTON, D. C.

UNITED STATES PATENT OFFICE.

HENRI WYSS, OF LEVALLOIS-PERRET, SWITZERLAND.

THRUST-BEARING.

SPECIFICATION forming part of Letters Patent No. 646,782, dated April 3, 1900.

Application filed August 25, 1898. Serial No. 689,529. (No model.)

*To all whom it may concern:*

Be it known that I, HENRI WYSS, residing at 48 Rue Deguingaut, Levallois-Perret, Switzerland, have invented certain new and useful Improvements in the Construction of Thrust-Bearings, of which the following is a specification.

My invention relates to improvements in the construction of thrust-bearings of any kind, but more particularly of those employed for the main shaft on screw-propelled ships.

Figure 1:
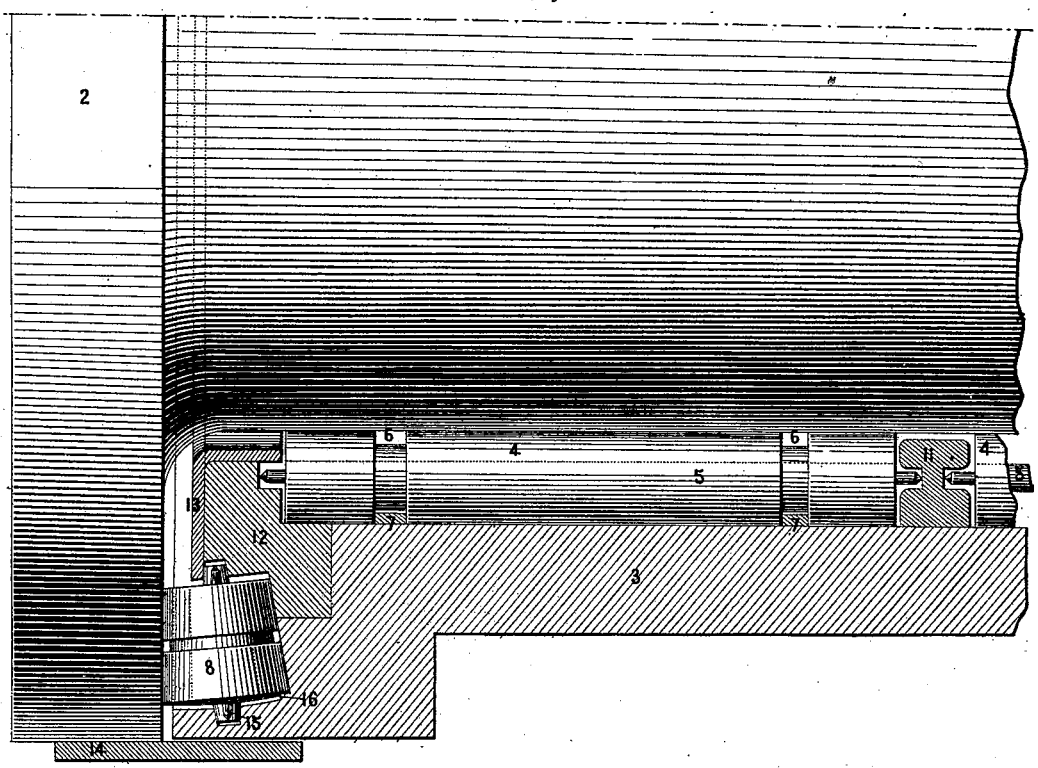
Figure 2:
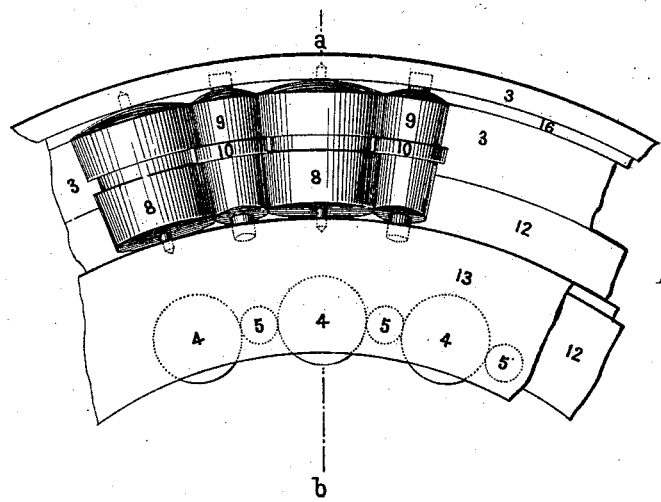

In the accompanying drawings, Figure 1 is a cross-sectional view through a bearing according to my invention, drawn at line $a\ b$ of Fig. 2. Fig. 2 is a portion of the plan of the same, the shaft being omitted.

The purposes of my invention are especially to provide means to facilitate the erection of the thrust-bearing and to allow of the shaft being withdrawn without any disturbance to the rollers and without taking to pieces.

1 is the shaft, and 2 is its flange or collar.

3 is the body or casing, which is made in one piece.

4 are the cylindrical supporting-rollers, preferably of steel. These rollers are kept apart from each other by intermediate spacing-rollers 5 of smaller diameter. All these rollers are provided with axial pins or pivots, as shown on Fig. 1. The rollers 4 are also provided with grooves 6. To keep the axes of these rollers parallel to that of the shaft, there are rings 7, fitting into the said grooves 6.

8 are the conical abutment-rollers, which are also separated from each other by intermediate or spacing conical rollers 9 of smaller diameter. All these conical rollers are also provided with axial pins or pivots. Moreover, each spacing-roller 9 has an annular projecting rib 10, engaging in a corresponding annular groove provided on each abutment-roller 8. This device insures a very perfect bearing, as will be hereinafter more fully explained. The axes of both sets of these rollers 8 and 9 are arranged radially around the shaft, so that the surfaces of the abutment-rollers 8 receive the thrust of the shaft, which they transmit to the body or casing 3. The pivots of the conical abutment-rollers 8 serve merely to prevent the falling of these rollers when the shaft is withdrawn, for these pivots do not touch either the ring 12 or the body or casing 3, as shown in the drawings. As they are conical, they cannot come nearer the axis of the shaft; but, on the contrary, their rotation has a tendency to take them farther from the said axis, so that these rollers need not be maintained at their smaller bases, but at their opposite ends they must be confined. I would not lengthen the pivots down to the bottom of the recess 15 provided in the body or casing 3, because at the end of each pivot would be a continuous friction or slipping action between that end and the bottom of the said recess 15. To avoid this friction, I provide a projecting circular rib 16, against which the rollers 8 bear with a proper rolling motion.

As to the spacing-rollers 9, the first condition to be satisfied is to keep their axes in the plane of the axes of both adjacent abutment-rollers 8. Consequently each of their pivots has a diameter equal to the width of the recess 15 and of the recess provided between the ring 12 and the flange 13. These pivots of rollers 9 roll properly on the lateral faces of said recesses; but to prevent longitudinal displacement of the rollers 9 without the pivots touching the bottom of said recesses I have provided each of them with the rib 10, taking into corresponding grooves provided in the rollers 8, as above stated.

To place the various rollers in position when erecting the bearing, the cylindrical rollers 4 and 5 are first inserted. Owing to the length of the bearing, which increases with the weight to be carried, there may be employed two or more sets of these rollers placed end to end, rings 11 being used between two sets, into which take the pins or pivots of the rollers. When the shaft is in position, the pivots do not bear on the rings, but when the shaft is withdrawn the said rings 11 retain the rollers in their proper places. When the cylindrical bearing-rollers are all in position, I put in place a ring 12, which is in section conveniently shaped so as to provide casings for the pivots both of the last cylindrical rollers and for the conical abutment-rollers. Then I put in place these latter rollers 8 and 9, and finally I cover their pivots by means of a flanged ring 13. Now the erection of the bearing is ended and, as it will be seen, the shaft can be withdrawn without any of the rollers falling. A ring 14 prevents dust or the like entering the bearing and lubricant going out of it.

It is obvious that the dimensions of the conical abutment-rollers may vary, according to the thrust which they will have to transmit to the bearing 3.

Having thus described my invention, what I claim is—

1. A thrust-bearing comprising a body 3 having recesses therein, cylindrical bearing-rollers, conical abutment-rollers, spacing-rollers between said abutment-rollers, a ring 12 having recesses therein, axial pivots on said abutment and spacing rollers which fit within the recesses in said body and said ring but terminate a short distance from the bottom walls thereof, and a rib 16 against which said abutment-rollers bear, as and for the purpose set forth.

2. A thrust-bearing comprising a body 3 having recesses therein, cylindrical bearing-rollers, conical abutment-rollers having annular grooves therein, spacing-rollers between said abutment-rollers provided with annular ribs which fit within said grooves, a ring 12 having recesses therein, axial pivots on said abutment and spacing rollers which fit within the recesses in said body and said ring but terminate a short distance from the bottom walls thereof, and a rib 16 against which said abutment-rollers bear, as and for the purpose set forth.

In testimony whereof I have hereunto set my hand in presence of two subscribing witnesses.

HENRI WYSS.

Witnesses:
FRANÇOIS COÉNAÉS,
MAURICE GODDYN.